Jan. 2, 1934.  R. RODRIAN  1,941,914
ELECTROCHEMICAL PROCESS FOR THE RECOVERY OF METALS
FROM ORES AND OTHER METAL BEARING MATERIALS
Original Filed Sept. 27, 1926

Step 1: Crush and pulverize ore

Step 2: "Unlock" pulverized ore by electrolysis with sodium carbonate solution

Filter solution from residue, wash residue, burn filter to ash

Step 3: Treat washed residue and filter ash, with nitric acid solution, first cold then under heat Separate resulting solution (A) from solid residue (B)

Wash residue (B) with water under heat, obtaining washed residue (B')

Filter solution (A) and wash water, burn filter to ash (C)

Step 4: Washed residue (B') and filtered ash (C) are treated with aqua regia, then dilute and heat Neutralize filtered solution (A) with sodium carbonate Filter neutralized solution from precipitated metal compounds (E) and wash filter Filtered neutralized solution (and if desired, spent electrolyte from Step 2.) evaporated to dryness, to produce fertilizer Precipitate (E) is treated with hydrochloric acid solution, producing chloride solution Electrolyze this chloride solution with addition of sulfuric acid, using iron anode Separate the resulting precipitate from the resulting iron chloride solution, wash precipitate Filter resulting solution (D) from solid residue (E) wash residue (E)

Electrolyze wash water and solution (D) with addition of Sulfuric acid using iron anode Separate the precipitated metals, and wash precipitate Inventor:
Richard Rodrian
By
Attorneys Patented Jan. 2, 1934

1,941,914

UNITED STATES PATENT OFFICE 1,941,914

ELECTROCHEMICAL PROCESS FOR THE RECOVERY OF METALS FROM ORES AND OTHER METAL BEARING MATERIALS

Richard Rodrian, New York, N. Y., assignor of one-half to Herman H. Butterman, New York, N. Y.

Application September 27, 1926, Serial No. 138,127. Renewed March 6, 1933

6 Claims. (Cl. 204—15)

The object of my present invention is to extract gold, platinum and other metals from ores or other materials containing such metals, and to secure a very high recovery.

In carrying out my invention, the material should first be ground or otherwise brought into finely powdered or divided form, if it is not in such form already. The material may consist of ores, minerals, tailings, wastes, or residues, metal compounds, etc., that is to say, any material that consists of metals, or that contains them.

While in such finely divided or comminuted condition, the metal-bearing material is treated successively with nitric acid and with aqua regia, the well-known mixture of hydrochloric and nitric acids.

In order to obtain the best results, however, and to avoid difficulties and loss in the operation, I have found it best to have the treatment with the acids preceded by a special electrolytic "unlocking" and reducing process, lasting from two to five days.

For this purpose, the comminuted material is placed in a vessel, in contact with a metallic cathode, which may consist of the vessel itself when the latter is a metallic vessel, or when a non-metallic vessel is employed, a sheet of lead or other suitable metal is placed at the bottom, within the vessel, and on this sheet forming the cathode the comminuted material is placed. Above such material an anode is arranged within the vessel, a small rod of carbon or of a metal such as lead, iron, etc. being generally used for this purpose. A plurality of such anodes may be employed if desired.

A suitable electrolyte liquid is also placed within the vessel in such a manner as to cover the comminuted material and to be in contact with the anode as well as with the cathode. This electrolyte will differ according to the nature of the material to be treated. In some cases, I may use plain water, that is, water taken from mains or from streams, lakes, wells, etc. In other cases, I should employ a conducting solution of a salt, for instance a salt (carbonate or other) of potassium, sodium, or magnesium, or an alkaline solution, such as caustic soda or potash, or a dilute solution of an acid, for instance sulfuric acid, or a compound or mixture of such substances.

This electrolytic "unlocking" and reducing treatment liberates hydrogen gas which, at the cathode, works on the metal particles and frees or "unlocks" and reduces them in solid form, from the compounds or other form (schist and crystalline formation and others) in which they may be contained in the material treated. After this "unlocking" operation, the material yields much more readily to the subsequent treatments, thereby effecting not only a saving in time, but a much higher extraction of the metals and particularly of the precious metals.

A portion of the hydrogen gas escapes from the liquid during the electrolytic "unlocking" treatment. At the end of the treatment, the liquid (which consists of the electrolyte with some substances, for instance acids or alkalies, which it has dissolved from the ore or other material under treatment) is separated by siphoning or otherwise from the solid product found at the bottom of the vessel. This product consists of the "unlocked" metals, together with sand, rock, etc. In some cases, the solid product should be washed with water after the removal of the liquid; in others, the simple separation of the liquid will suffice. This will depend on the character of the material treated.

The material unlocked and reduced as set forth above is then treated with dilute nitric acid for about twenty-four hours, preferably applying heat slowly during the last few hours of this treatment. Vapors (fumes) of NO and $NO_2$ are sometimes evolved during this treatment. Those metals which are attacked by nitric acid will be dissolved or extracted by the acid and go into solution. Among these metals I will name those of the alkalies and of the alkaline earths, also lead, copper, iron, and even some precious metals, such as silver and palladium. The solid residue remaining after the treatment with nitric acid consists of the metals, such as platinum and gold, which are not attacked by said acid, and of insoluble constituents such as sand, rock, etc. This solid residue is then separated from the liquid or solution by siphoning the latter off, or in any other suitable manner, and the residue is then washed with water, the wash water being subsequently added to the said solution, producing a liquid which I will call liquid A, while the washed residue shall be referred to as residue B.

The liquid A is neutralized by means of sodium carbonate or other suitable alkali, heat being applied during this treatment. Some carbon dioxide may escape, but the main products of this treatment are a solution and a solid constituent, the solution containing nitric acid, alkali nitrate, and those non-metallic portions of the ore or other material which are soluble in nitric acid or in alkali nitrate. This solution is separated by filtration or otherwise, and then evaporated to dryness, the resulting product (salts) being a good fertilizer for plants, and constituting a valuable by-product of my process. The solid constituent which has been separated by the filtration consists of metals soluble in nitric acid, which are precipitated in the form of oxides or carbonates. These oxides and carbonates are then dissolved in hydrochloric acid to a clear solution, and a small amount of sulfuric acid is added. The resulting liquid is electrolyzed in a vessel made of, or lined with, sheet lead forming the cathode, an iron anode being employed; I use a direct current of from 4 to 6 volts and about 10 to 50 amperes, depending on the size of the electrodes and the quantity and concentration of liquid to be electrolyzed. The result of this treatment is the precipitation of all the metals contained in hydrochloric acid solution, except the iron, these precipitated metals settling on the sheet lead cathode. The liquid electrolyte will become an iron chloride solution, part of the iron coming from the iron anode and another part having been contained in the solution previously, extracted from the original material under treatment. This electrolytic treatment should be arrested when the solution takes a light green color. If the treatment is continued too long, some of the dissolved iron will be precipitated at the cathode. The metals precipitated by this electrolysis will be separated by filtration or otherwise from the iron chloride solution, and are then ready for separation, smelting and refining according to any well-known or approved process. The iron chloride solution separated by the filtration may be treated in any suitable manner for the recovery of the hydrochloric acid and of the iron.

The solid residue, B, resulting from the nitric acid extraction described above, is treated with aqua regia (three parts of hydrochloric acid and one part of nitric acid) for about twenty-four hours, heating the solution slowly during the last few hours of this treatment. If the material to be treated is very rich in metals, a second and in some cases even a third treatment with aqua regia is desirable or necessary, the solution being poured off or otherwise removed after each of these treatments, before applying the next amount of aqua regia. If the material contains platinum, a good degree of heat should be applied during the extraction.

The extraction having been completed, and the sand, rock, and other undissolved material having been allowed to settle, such material is separated from the liquid and thoroughly washed with hot water (or washed with cold water while heating the mass). Both the liquid or solution and the water which has been used for this washing operation should be clear. In some cases, they are obtained at once in a clear condition; in others, the solution or the used wash water, or both, may have to be filtered, either separately or together, to obtain clear liquids. Whether filtration is required or not, depends on the character of the material treated.

A small amount of sulfuric acid is added to the aqua regia metal solution (the used wash water being also poured into said solution, as a rule). This liquid, which contains the platinum and other metals present in the material under treatment, is then electrolyzed with a direct current of about 4 to 6 volts, and about 10 to 50 amperes, depending on the size of the electrodes and the concentration of the solution. As an anode, I use an iron electrode, and as a cathode, iron, lead, mercury, or any other suitable metal, in the form of a vessel, rod, plate, etc., or in the case of mercury, of a body of this metal confined in the lower portion of the treatment vessel. As explained in conjunction with the first electrolytic step of my process, the entire vessel may be made of the cathode metal, or a non-conducting vessel may be employed, with a cathode located therein near the bottom. During the electrolysis of the aqua regia metal solution, some of the iron of the anode goes into solution, while the gold, platinum and other metal contents of the solution are precipitated on and at the cathode. There will remain in solution the iron dissolved from the anode and, in some cases, iron which the aqua regia has extracted from the material under treatment. The progress of the electrolysis should be watched carefully, since if it is continued too long, some of the iron will settle at the cathode. With this proviso, the electrolysis is to be continued until all the gold and other metal contents have been precipitated entirely. The electrolyte is then separated, by filtration, from the precipitated metals, and the latter are washed carefully. The separated solution (to which the used wash water may be added) consists of an acid iron solution, which may be treated in any well-known or approved manner for the recovery of the acid and the iron. The precipitate containing gold and other metals (including platinum metals if such were present in the material under treatment) is then ready for separation, smelting, and refining in any suitable manner.

Very high values are recovered by my improved electrochemical process described above, from ores or other metal-containing substances. This process is particularly efficient for the recovery of gold from high-grade ore or other material rich in gold, in fact no other process known to me will effect such high recoveries. It is well-known that in the usual processes, the recovery of gold and other valuable metals is hindered considerably by the presence of certain impurities or foreign substances, for instance arsenic, zinc, tellurium, or too large a proportion of iron sulfide. Again, some of the processes commonly employed, for instance the amalgamation process and the cyanide process, recover only certain precious metals, and particularly gold, which the ore contains in the free state, whereas my process will recover the gold irrespective of the form in which it is contained, and will also recover most of the other metals. Bearing in mind the manifold forms in which metals appear in ores (oxides, sulfide, salts and other compounds, mixed or fused with other substances such as silicates etc.) it will be evident that a reducing treatment of especial efficiency is required to extract the full value of the precious metal contents.

While the superiority of my process has been established definitely by actual tests, the exact reason for this superiority has not been determined with certainty. I consider it, however, a plausible and probably correct explanation to assume that the metal atoms of ores as found to-day have been subjected to countless successive changes in the course of the centuries of geological history, where such influences as heat and the chemical action of brine and other liquids, as well as substances such as alkalies, sulfur, etc. may readily be imagined as having profoundly altered the condition of the metal atoms, particularly when alloyed with other metals, or fused together with non-metallic elements. Thus many of these metal atoms may have lost their ordinary metallic character, at least to the extent that they do not respond to the standard treatments such as amalgamation, cyaniding, or smelting with or without lead.

I have found that it is important to subject the ore or other metal-bearing material to a thorough preliminary electrolytic reduction treatment and then successively to the action of nitric acid and aqua regia, followed by the addition of sulfuric acid to the solution and the electrolyzing of the resulting liquid with an iron anode, thereby precipitating the metals from the metal chloride solution, the iron being left in solution, by a proper control of the electrolysis.

It will be understood that the improved process may be applied to any metal-bearing material, whether ores, other minerals, scrap, slag, tailings, waste materials of various kinds, metal alloys, metal compounds, etc.

With certain types of material to be treated, I may use a carbonate of an alkali, for instance sodium carbonate, for neutralizing the nitric acid solution of the metals as well as the aqua regia solution. In such cases the precipitated metal oxides and metal carbonates, after filtration and washing, are dissolved in hydrochloric acid, together or separately, and after adding sulfuric acid to the resulting solutions, the latter are electrolyzed with an iron anode, in the same manner as described above.

A very important advantage of my improved process is the recovery of most of the metals if not all, separating such metals from the iron, which after the electrolysis remains in solution (chloride or aqua regia solution) provided the electrolytic treatment is conducted with care and stopped in time.

The process described herein is more expensive than those in common use, but it is a very efficient and easily performed process for the recovery of the metals, and particularly gold and platinum, from ore or other material rich in precious metals, the increased recovery more than compensating for the higher cost of the treatment. When treating low grade ores, the cost can be brought down by using the same acid over and over again on successive amounts or batches of ore. Thus if the ore is treated in batches of one ton each, the acid which has been used for treating the first ton can be used again for a second ton, and in some cases a third and fourth, and more, being employed for the treatment of additional batches until the acid is fully saturated with metals.

One of the factors which increase the economic value of my process is the recovery of a good fertilizer salt as a by-product of the nitric acid treatment. Furthermore, some of the acid and iron can be recovered after completing the electrolysis precipitating metals from the iron chloride solution.

The gold contents of the metal precipitate obtained by my process are true metallic gold which can be separated from the other metals in any well-known or approved manner.

The improved treatment may also be applied, with considerable imrovement as regards the degree and quality of metal extraction or recovery, to the gold-bearing metal compounds or products obtained by the well-known amalgamation, or by the cyanide process.

Great success will also attend the use of my present improved process when applied to the treatment of any alloy containing precious metals, such as silver, gold, or platinum, the recovery, separation, and refining of the precious metals being effected with high efficiency.

I desire to be understood that (as will also appear from the appended claims) according to the nature of the material under treatment, I shall employ somewhat different steps for recovering the metals, dissolved and extracted, converted into chlorides, and precipitated out as real metals.

As an illustrative example of a practical application of my process, represented in the accompanying drawing or flow sheet I will describe the treatment which I gave 5 pounds of rich gold-bearing ore:

Step 1 consisted in crushing and pulverizing the ore to a minimum of eighty mesh.

Step 2 was an electrolytic treatment for breaking up or "unlocking" the pulverized ore to reduce the metals contained therein. In this treatment, I used a stone jar having a plate of sheet lead on the inner or upper face of its bottom. From this plate, which constituted the cathode, a strip of lead was run upwardly through a glass tube, so as to keep such strip out of contact with the electrolyte, which consisted of a solution of ½ pound of sodium carbonate in two gallons of plain water. As an anode, I used a lead rod about ⅜ of an inch thick, suspended in the center of the jar and extending within the electrolyte to about within 2 inches from the ore, which latter was spread on the lead cathode. A direct current of about 4 to 6 volts and 2 to 6 amperes was employed. A higher voltage, say 110 volts, might be used, but in this case a resistance would have to be placed in series with the electrolytic apparatus. The treatment was continued for about 2 or 3 days. The destruction of all the natural formation of the ore indicated that the treatment had been completed and that it was time for filtering off the solution from the solid residue of the ore, washing the residue with water, and also, if the highest possible recovery was desired, drying and burning the filter to save the values retained therein.

Step 3 was the extraction of metals by nitric acid and recovery of the dissolved metals (nitrates). For this purpose, the "unlocked" ore and the filter ash were put in a porcelain dish and covered with 2½ pounds of commercial nitric acid of 38%, diluted with a like amount of water. This mass was allowed to stand for about twenty hours, and then heated for four hours. The solution was then separated from the solid residue (ore). This ore residue was washed with water while heating, and the solution previously separated and the water which had been used for said washing were filtered together. The filter was dried and burned, and the filter ash as well as the solid ore residue put aside for the subsequent extraction with aqua regia (step 4). The clear nitric acid solution was then neutralized completely with sodium carbonate, under application of heat. This caused all metals to be precipitated as oxides and carbonates. The neutralized solution was filtered, the precipitated metal oxides and carbonates being retained by the filter. The latter was then washed very thoroughly. The filtered solution (if desired, with the addition of the spent electrolyte from the second step), was evaporated to dryness, thereby obtaining a salt by-product valuable for use as a fertilizer. The metals from which the solution was separated were dissolved in about 1 pound of commercial hydrochloric acid, dissolved in a like amount of water, heat being applied during this dissolving treatment, which was continued until the solution was clear, showing that all the metal oxides and carbonates had been dissolved perfectly as chlorides. I then took the same porcelain dish as before, and placed inside the same, on its bottom, a plate of sheet lead from which a strip of lead was run to the outside of the dish for connection with the negative pole of a source of direct current of about 3 to 4 volts and about 10 amperes. As an anode, I used a flat iron ¼ of an inch thick, 2 inches wide, and about 10 inches long. The electrolyte was formed by the metal solution, with the addition of four ounces of sulfuric acid of 1.25 specific gravity. By chemical action, prior to electrolysis, the lead contained in the solution was converted into lead sulfate. The iron anode dipped into the electrolyte and extended to within about an inch from the lead plate forming the cathode. During the electrolysis, the lead sulphate was converted into lead, and all the heavy metals except iron were precipitated as metals, settling on the cathode. The purpose of adding sulfuric acid was to produce iron sulfate, the presence of which, as I have found, prevents the gold from remaining in solution. When the electrolyte exhibited a light green color, this indicated that it was time to stop the electrolysis. Filtration was then employed to separate the precipitated metals from the iron chloride solution, and after washing it thoroughly, the precipitate was ready for separation, smelting, and refining. The iron chloride solution separated by the filtration was treated for the recovery of iron and hydrochloric acid, if it was desired to conduct the process as economically as possible.

Step 4 consisted in an extraction of metals by means of aqua regia, and a recovery of the dissolved metals. The residue (solid) left from the nitric acid extraction, and the ash obtained by burning the filters, were put in a porcelain dish and covered with 2½ pounds of aqua regia. After allowing this mass to stand for about twenty hours, I diluted the aqua regia with half the amount of hot water and heated the mass for about four hours. The residue (solid) was separated from the solution by filtration and washed with water. In the event that the ore was very rich in metals, and especially in gold, a second extraction with aqua regia was performed in the same way. All the clear aqua regia solution and the used wash water were then put together and electrolyzed in the same manner as explained above in connection with the electrolysis of the metal chloride solution, in a porcelain dish, using a sheet lead bottom as cathode and iron as an anode, four ounces of sulfuric acid having been added to the aqua regia solution. Some of the iron of the anode went into solution during this electrolysis, and remained in solution, all the other metals were precipitated and settled upon the lead cathode. The termination of this treatment was indicated when the solution took a brown color, the metals and especially the gold (but with the exception of the iron) lying on the sheet lead bottom. The precipitated metals were separated by filtration, and washed, being thus made ready for separation, smelting, and refining.

Various modifications may be made without departing from the nature of my invention as set forth in the appended claims.

I claim:

1. The herein described process which consists in effecting an electrolytic unlocking of the metal-bearing material, then treating the unlocked material with nitric acid, treating the residue with aqua regia for dissolving the metals left, especially gold and platinum, adding sulfuric acid to the clear aqua regia metal solution and electrolyzing this solution for precipitation of the metals with an iron electrode as anode, leaving the iron in solution.

2. The herein described process of treating alloys, metal compounds and other metal-bearing materials, such as ore and other metal-bearing minerals, slag, tailings and residues, which consists in first subjecting them to the action of nitric acid for dissolving base metals and compounds of the alkali and alkaline earth metals, converting the recovered metals into chlorides, treating the residue with aqua regia for dissolving and extracting the metals left therein, especially gold and platinum, and electrolyzing the recovered metal solutions, with the addition of sulfuric acid, using an iron anode and a sheet lead cathode, to recover the metals from the solutions, while leaving the iron in solution.

3. The herein described process which consists in extracting metals from any gold bearing material with aqua regia, and electrolyzing this aqua regia metal solution for precipitating the metals, with an iron anode, after adding sulfuric acid to the electrolyte, the iron remaining in solution.

4. The herein described process which consists in treating any gold and platinum bearing metal alloy first with nitric acid and then with aqua regia, and electrolyzing the aqua regia solution for precipitating the metals, especially gold and platinum, with an iron anode, adding sulfuric acid to the electrolyte.

5. The herein described process which consists in electrolyzing a gold-bearing solution of metal chloride in the presence of an alkali salt, with an iron anode, after adding sulfuric acid to the electrolyte.

6. The herein described process which consists in bringing an alloy containing gold and platinum into a finely divided form, this material then being treated first, with any dissolving medium for removing the base and cheaper metals, the residue then being treated with aqua regia for dissolving the gold and platinum, and this aqua regia solution then being electrolyzed for precipitation of the gold and the platinum with an iron anode, after adding sulfuric acid to the solution.

RICHARD RODRIAN.